United States Patent
Vollmer

(10) Patent No.: US 9,935,534 B2
(45) Date of Patent: Apr. 3, 2018

(54) ELECTRIC MACHINE WITH PERMANENTLY EXCITED INNER STATOR

(71) Applicant: SIEMENS AKTIENGESELLSCHAFT, München (DE)

(72) Inventor: Rolf Vollmer, Gersfeld (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 177 days.

(21) Appl. No.: 14/674,957

(22) Filed: Mar. 31, 2015

(65) Prior Publication Data

US 2015/0280536 A1    Oct. 1, 2015

(30) Foreign Application Priority Data

Apr. 1, 2014 (EP) .................................... 14163031

(51) Int. Cl.
| | |
|---|---|
| *H02K 1/20* | (2006.01) |
| *H02K 9/19* | (2006.01) |
| *H02K 16/04* | (2006.01) |
| *H02K 21/04* | (2006.01) |
| *H02K 21/40* | (2006.01) |
| *H02K 1/02* | (2006.01) |

(52) U.S. Cl.
CPC ............... *H02K 21/40* (2013.01); *H02K 1/02* (2013.01); *H02K 1/20* (2013.01); *H02K 9/19* (2013.01); *H02K 16/04* (2013.01)

(58) Field of Classification Search
CPC .. H02K 1/17; H02K 1/32; H02K 1/20; H02K 16/04; H02K 9/19; H02K 19/103

USPC ........ 310/52, 54, 58, 59, 103, 104, 112, 266
See application file for complete search history.

(56) References Cited

U.S. PATENT DOCUMENTS

| | | | | |
|---|---|---|---|---|
| 3,237,036 A | * | 2/1966 | Konig ................... | H02K 23/56 310/198 |
| 3,566,168 A | * | 2/1971 | Matsubara ........... | H02K 49/043 310/105 |
| 3,789,252 A | * | 1/1974 | Abegg .................... | H02K 1/16 310/112 |
| 5,744,895 A | * | 4/1998 | Seguchi .................. | B60K 6/26 310/112 |
| 5,772,410 A | * | 6/1998 | Chang ................... | F04B 35/045 417/363 |

(Continued)

FOREIGN PATENT DOCUMENTS

| | | |
|---|---|---|
| DE | 1763298 A1 | 10/1971 |
| DE | 19838378 A1 | 3/2000 |

(Continued)

*Primary Examiner* — Thomas Truong
(74) *Attorney, Agent, or Firm* — Henry M. Feiereisen LLC

(57) ABSTRACT

An electric machine includes an outer stator having a plurality of windings, an inner stator having a plurality of permanent magnets and arranged within the outer stator in concentric relationship to the outer stator, and a rotor arranged between the outer stator and the inner stator in concentric relationship to the outer and inner stators and movable relative to the outer and inner stators. The rotor includes a mounting element which is made from a non-magnetic material and has a plurality of recesses, with a magnetically soft segment being arranged in each of the recesses. A first cooling device cools the permanent magnets of the inner stator.

6 Claims, 3 Drawing Sheets

(56) References Cited

U.S. PATENT DOCUMENTS

| | | | |
|---|---|---|---|
| 6,144,130 A * | 11/2000 | Kawamura | H02K 1/278 |
| | | | 310/156.12 |
| 6,483,221 B1 | 11/2002 | Pawellek | |
| 6,628,031 B2 | 9/2003 | Vollmer | |
| 6,768,238 B2 | 7/2004 | Knauff | |
| 6,812,612 B2 | 11/2004 | Schunk | |
| 6,858,965 B2 | 2/2005 | Mueller | |
| 6,885,187 B2 | 4/2005 | Duenisch | |
| 6,943,467 B2 | 9/2005 | Potoradi | |
| 7,141,905 B2 | 11/2006 | Vollmer | |
| 7,285,883 B2 | 10/2007 | Bott | |
| 7,564,158 B2 | 7/2009 | Huth | |
| 7,709,984 B2 | 5/2010 | Braun | |
| 7,732,967 B2 | 6/2010 | Vollmer | |
| 7,755,315 B2 | 7/2010 | Bott | |
| 7,777,373 B2 | 8/2010 | Bott | |
| 7,859,160 B2 | 12/2010 | Vollmer | |
| 7,915,777 B2 | 3/2011 | Vollmer | |
| 7,977,826 B2 | 7/2011 | Vollmer | |
| 8,022,580 B2 | 9/2011 | Budde | |
| 8,026,640 B2 | 9/2011 | Bott | |
| 8,063,517 B2 | 11/2011 | Bott | |
| 8,115,360 B2 | 2/2012 | Vollmer | |
| 8,134,273 B2 | 3/2012 | Vollmer | |
| 8,227,951 B2 | 7/2012 | Grossmann | |
| 8,283,815 B2 | 10/2012 | Vollmer | |
| 8,378,541 B2 | 2/2013 | Vollmer | |
| 8,441,158 B2 | 5/2013 | Vollmer | |
| 8,674,560 B2 | 3/2014 | Budde | |
| 8,853,894 B2 | 10/2014 | Fick | |
| 8,922,072 B2 | 12/2014 | Bott | |
| 2004/0096339 A1 * | 5/2004 | Bamberger | F04D 25/082 |
| | | | 417/350 |
| 2006/0219880 A1 | 10/2006 | Braun | |
| 2007/0040466 A1 | 2/2007 | Vollmer | |
| 2007/0114861 A1 | 5/2007 | Bott | |
| 2007/0257566 A1 | 11/2007 | Vollmer | |
| 2007/0257575 A1 | 11/2007 | Vollmer | |
| 2008/0169718 A1 | 7/2008 | Schunk | |
| 2008/0185931 A1 | 8/2008 | Platen | |
| 2008/0246365 A1 * | 10/2008 | Wilsdorf | F03B 17/061 |
| | | | 310/261.1 |
| 2008/0289440 A1 | 11/2008 | Vollmer | |
| 2008/0315704 A1 | 12/2008 | Vollmer | |
| 2009/0009114 A1 | 1/2009 | Schunk | |
| 2009/0015080 A1 | 1/2009 | Vollmer | |
| 2009/0152959 A1 | 6/2009 | Vollmer | |
| 2009/0160283 A1 | 6/2009 | Vollmer | |
| 2009/0184602 A1 | 7/2009 | Braun | |
| 2009/0251013 A1 | 10/2009 | Vollmer | |
| 2009/0295251 A1 | 12/2009 | Vollmer | |
| 2009/0302832 A1 | 12/2009 | Budde | |
| 2009/0315424 A1 | 12/2009 | Vollmer | |
| 2010/0000830 A1 | 1/2010 | Budde | |
| 2010/0013333 A1 | 1/2010 | Vollmer | |
| 2010/0102649 A1 * | 4/2010 | Cherney | H02K 1/20 |
| | | | 310/54 |
| 2010/0133940 A1 | 6/2010 | Grossmann | |
| 2010/0264770 A1 | 10/2010 | Braun | |
| 2011/0012458 A1 * | 1/2011 | Atallah | H02K 49/102 |
| | | | 310/103 |
| 2012/0025654 A1 | 2/2012 | Bach | |
| 2013/0127264 A1 | 5/2013 | Fick | |
| 2013/0147285 A1 | 6/2013 | Vollmer | |
| 2013/0241324 A1 | 9/2013 | Mader | |
| 2013/0241335 A1 | 9/2013 | Vollmer | |
| 2013/0241338 A1 | 9/2013 | Mader | |
| 2013/0249340 A1 | 9/2013 | Potoradi | |
| 2014/0009026 A1 * | 1/2014 | Klopzig | H02K 21/40 |
| | | | 310/156.69 |
| 2014/0028135 A1 | 1/2014 | Vollmer | |
| 2014/0042857 A1 | 2/2014 | Vollmer | |

FOREIGN PATENT DOCUMENTS

| | | | | |
|---|---|---|---|---|
| DE | 102011012454 A1 | 8/2012 | | |
| EP | 2503671 A1 | 9/2012 | | |
| EP | 2528207 A1 * | 11/2012 | | H02K 21/40 |
| WO | WO 2012126712 A1 * | 9/2012 | | H02K 21/40 |

\* cited by examiner

ELECTRIC MACHINE WITH PERMANENTLY EXCITED INNER STATOR

CROSS-REFERENCES TO RELATED APPLICATIONS

This application claims the priority of European Patent Application, Serial No. EP 14163031.9, filed Apr. 1, 2014, pursuant to 35 U.S.C. 119(a)-(d), the disclosure of which is incorporated herein by reference in its entirety as if fully set forth herein.

BACKGROUND OF THE INVENTION

The present invention relates to an electric machine with permanently excited inner stator.

The following discussion of related art is provided to assist the reader in understanding the advantages of the invention, and is not to be construed as an admission that this related art is prior art to this invention.

Electric machines are known which include an outer stator and an inner stator, between which a rotor is arranged. Electric machines can be designed as synchronous machines, in particular three-phase synchronous machines. Such three-phase synchronous machines can be operated as a motor or as a generator, for example, and are steadily gaining in significance. Permanently excited three-phase synchronous machines are known in the art and include permanent magnets arranged on the rotor or the armature. Permanent magnets have the disadvantage of limited operating temperatures. For this reason, magnets made of rare earths are increasingly used because of their higher operating temperatures in comparison with permanent magnets which are normally used. A disadvantage of rare-earth magnets is their high price. Moreover, cooling of the rotor and/or the permanent magnets, e.g. by water cooling, can only be achieved at high cost.

It would therefore be desirable and advantageous to provide an improved electric machine, in particular synchronous machine which obviates prior art shortcomings and which is simple in structure and yet reliable in operation in an economical and effective manner.

SUMMARY OF THE INVENTION

According to one aspect of the present invention, an electric machine includes an outer stator having a plurality of windings, an inner stator having a plurality of permanent magnets and arranged within the outer stator in concentric relationship to the outer stator, a rotor arranged between the outer stator and the inner stator in concentric relationship to the outer and inner stators and movable relative to the outer and inner stators, the rotor including a mounting element made from a non-magnetic material and having a plurality of recesses, with a magnetically soft segment being arranged in each of the recesses, and a first cooling device configured to cool the permanent magnets of the inner stator.

The electric machine can be designed as a three-phase synchronous machine and can be used as a motor or as a generator. The electric machine includes an outer stator, which has a plurality of windings. For this purpose, the outer stator can have corresponding slots, in which the windings are arranged. The rotor is arranged within the outer stator and can be connected to a shaft in a non-rotatable manner. The rotor itself includes a mounting element, which is made from a non-magnetic material. A non-magnetic material cannot usually be influenced by a magnetic field. A plurality of magnetically soft segments is embedded in the mounting element. Finally, the electric machine includes an inner stator, which has a plurality of permanent magnets. It is thereby possible to provide a permanently excited three-phase synchronous machine, in which the permanent magnets are arranged at the inner stator and therefore do not move during operation of the electric machine. Consequently, heat which is produced during operation of the electric machine can be carried away from the permanent magnets more easily than in the case of electric machines in which the permanent magnets are provided in the rotor.

The electric machine has a first cooling device for cooling the inner stator. Heat produced during operation of the electric machine can therefore be reliably carried away from the permanent magnets of the inner stator. In this way, it is possible to prevent the permanent magnets from becoming demagnetized. Consequently, magnets having lower coercive field strength can be used. This in turn means that permanent magnets having a lower proportion of rare earths can be used. In this way, the remanence can be increased and the costs can be reduced.

According to another advantageous feature of the present invention, a second cooling device can be provided to cool the outer stator. The second cooling device allows the windings of the outer stator to be prevented from overheating during operation of the electric machine and possibly being damaged as a result. In this way, it is possible to ensure reliable operation of the electric machine.

According to another advantageous feature of the present invention, the first cooling device and/or the second cooling device has a plurality of cooling tubes for passage of a cooling liquid. For example, water or a water-glycol mixture can be used as a cooling liquid. Suitable cooling tubes can be manufactured easily and economically. Advantageously, the cooling tubes can be arranged in an iron core assembly of the inner stator and/or the outer stator. For example, the cooling tubes of the first cooling device and/or the second cooling device can be provided by corresponding holes which are made in the respective iron core assembly. Such cooling tubes can be manufactured easily and economically.

According to another advantageous feature of the present invention, the cooling tubes can be arranged uniformly distributed in a circumferential direction along an axial direction of the electric machine. By virtue of such an arrangement of the cooling tubes, heat produced during operation of the electric machine in both the inner stator and the outer stator can be carried away uniformly.

According to another advantageous feature of the present invention, the permanent magnets of the inner stator can be made from a ferrite. The use of a ferrite has the advantage that economical permanent magnets can therefore be used for the inner stator.

According to another advantageous feature of the present invention, the permanent magnets of the inner stator can contain iron-neodymium-boron. Such permanent magnets of the inner stator contain iron, neodymium and/or boron, and exhibit high temperature stability.

According to another advantageous feature of the present invention, the rotor can have a pot-shaped configuration. Such an embodiment of the rotor has the advantage that a rotor with a low mass inertia can therefore be provided. In this way, an electric machine or motor with a high dynamic performance can be provided.

According to another advantageous feature of the present invention, the rotor can be connected to a shaft which is designed as a hollow shaft. When the electric machine is used for a machine tool in particular, the use of a hollow shaft allows a flexible configuration of the machine tool.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
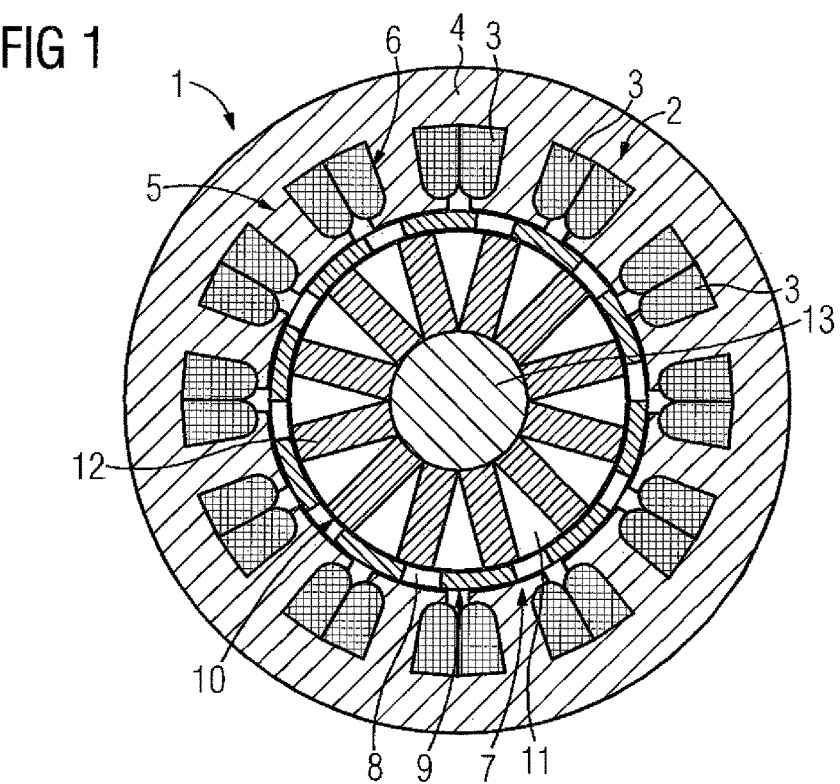
FIG. 1 is a cross section of a first embodiment of an electric machine according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a cross section of a first embodiment of an electric machine according to the present invention, generally designated by reference numeral 1. The electric machine 1 includes an outer stator 2. The outer stator 2 has an iron core assembly 4, having a plurality of teeth 5 which are separated by slots 6. Corresponding windings 3 are inserted into the slots 6. The windings 3 are usually electrically connected to a three-phase network (not shown here). A rotor 7 is arranged within the outer stator 2. The rotor 7 is arranged concentrically to the outer stator 2 in this case. The rotor 7 has a mounting element 8, which is made from a non-magnetic material. The mounting element 8 has a plurality of recesses, into which magnetically soft segments 9 are embedded in each case. The electric machine 1 also has an inner stator 10. The inner stator 10 is arranged concentrically within the rotor 7. The inner stator 10 has an iron core assembly 11, comprising a plurality of recesses in which a permanent magnet 12 is arranged in each case. The permanent magnets 12 can contain neodymium-iron-boron, for example.

In the present exemplary embodiment, the outer stator 2 or its windings 3 have the number of pole pairs pw=4. The inner stator 10 or its permanent magnets 12 have the number of pole pairs pm=6. The rotor 7 here has ten magnetically soft segments 9. Therefore the number of pole pairs of the rotor is pr=10. .The number of externally effective pole pairs in this case corresponds to the number of pole pairs of the rotor. The numbers of pole pairs of the electric machine 1 can generally be combined according to the following formula:

$$pr = |pm +/- pw|$$

Figure 2:
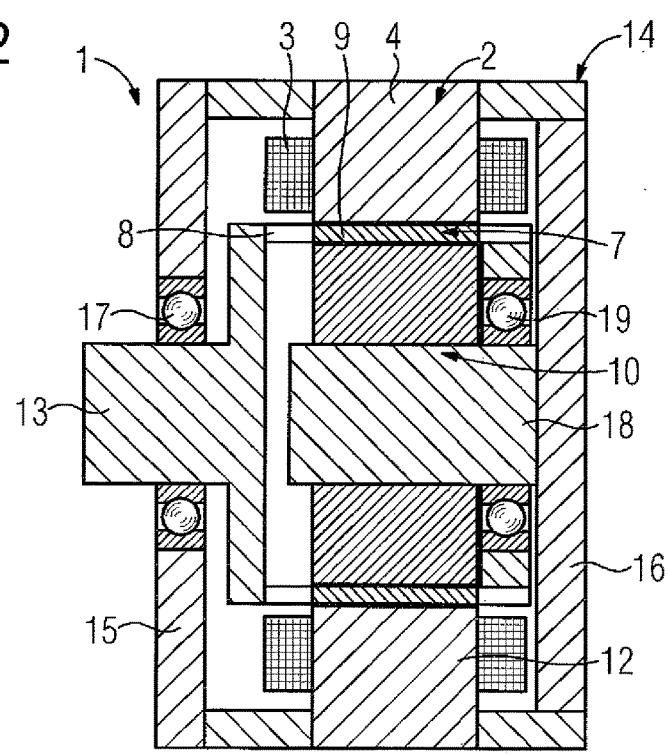
FIG. 2 is a longitudinal section of the electric machine of FIG. 1.

FIG. 2 shows the electric machine 1 according to FIG. 1 in longitudinal section. It can be seen here that the rotor 7 is so designed as to be pot-shaped. The pot-shaped rotor 7 is connected to a shaft 13 in a non-rotatable manner. A housing 14 of the electric machine can also be seen in FIG. 2. The housing 14 has a first flange 15 on the drive side. The housing 14 has a second flange 16 on the non-drive side. A first bearing 17 is arranged between the first flange 15 and the shaft 13, and is designed as e.g. a ball bearing. The electric machine 1 also has a supporting element 18, on which the inner stator 10 is held. A second bearing element 19 is arranged between the supporting element 18 and the rotor 7, and can likewise be designed as a ball bearing.

Figure 3:
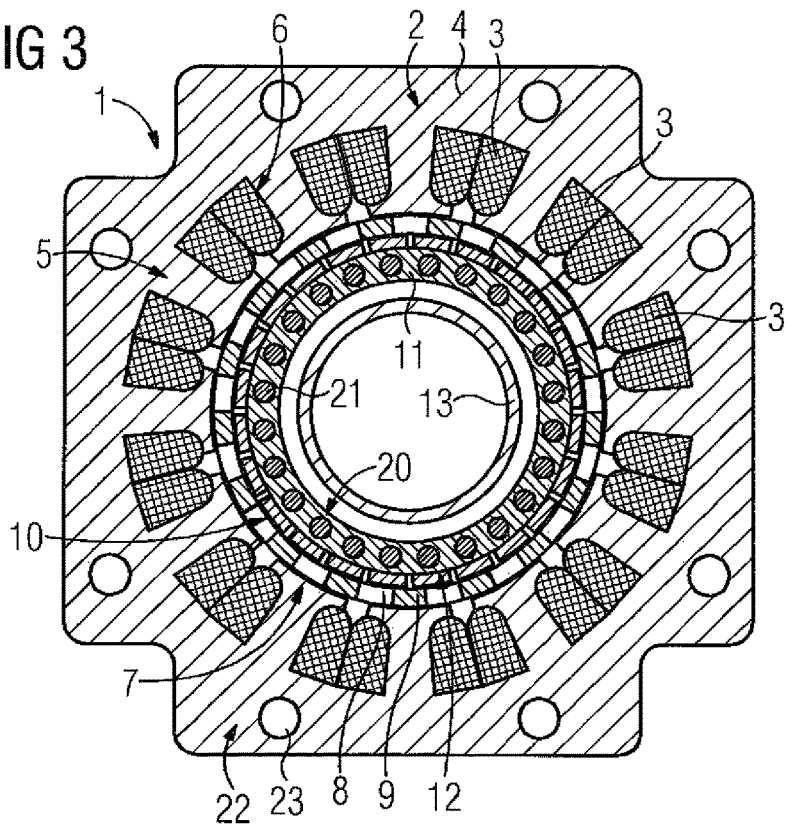
FIG. 3 is a cross section of a second embodiment of an electric machine according to the present invention.

FIG. 3 shows a further embodiment variant of an electric machine 1 in cross section. The electric machine 1 represented in FIG. 3 differs from that in FIG. 1 in that the electric machine 1 has a first cooling device 20 for cooling the inner stator 10. The first cooling device 20 comprises a plurality of cooling tubes 21, which are arranged within the iron core assembly 11 of the inner stator 12. The cooling tubes 21 are uniformly arranged in a circumferential direction of the inner stator 12. The cooling tubes 21 extend along the axial direction of the electric machine 1. The permanent magnets 12 can be cooled by means of the first cooling device 20. In the case of the electric machine 1 according to FIG. 3, the permanent magnets 12 can be made from a ferrite, for example.

The electric machine 1 additionally comprises a second cooling device 22. The second cooling device 22 likewise comprises a plurality of cooling tubes 23 which extend along the axial direction of the electric machine. The cooling tubes 23 of the second cooling device 22 are likewise uniformly arranged in the circumferential direction of the outer stator 2. A cooling medium, in particular a cooling liquid, can flow through the cooling tubes, 21, 23. The windings 3 of the outer stator 2 can be cooled by means of the second cooling device 22. By virtue of the first cooling device 20, the heat which is produced during operation of the electric machine 1 can be carried away from the inner stator 10. In this way, it is possible to prevent the permanent magnets 9 from overheating and therefore becoming demagnetized.

In the case of the exemplary embodiment according to FIG. 3, the winding system in the outer stator 2 has the number of pole pairs pw=5. The number of permanent magnets 12 in the inner stator 10 gives the number of pole pairs pm=12 for the inner stator 10. Applying the formula cited above, the number of externally effective pole pairs of the rotor 7 is pr=17.

Figure 4:
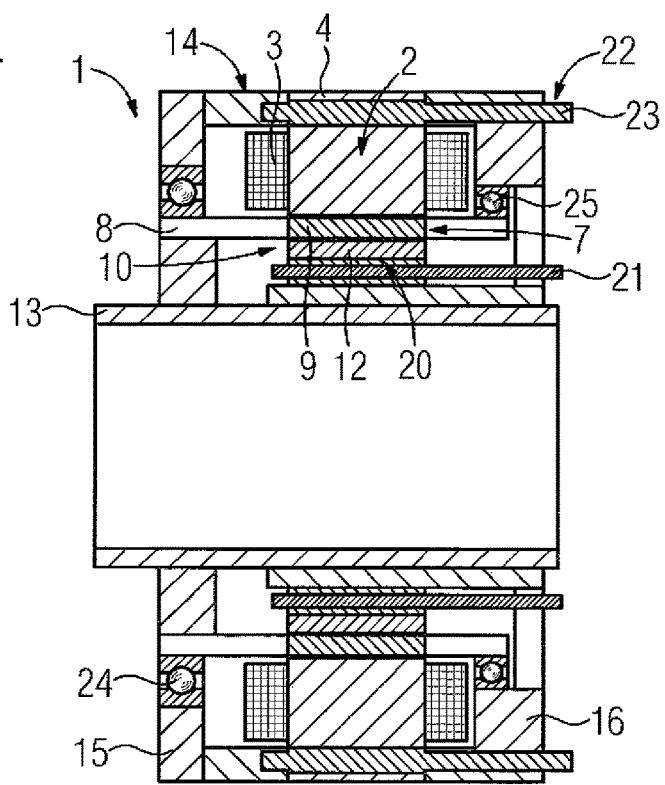
FIG. 4 is a longitudinal section of the electric machine of FIG. 3.

FIG. 4 shows the electric machine 1 according to FIG. 3 in cross section. In this context, it can be seen that the shaft 13 of the electric machine 1 is designed as a hollow shaft in the present exemplary embodiment. In addition, the electric machine 1 in this context has a first bearing element 24 and a second bearing element 25. The first bearing element 24 is arranged between the first flange 15 and the rotor 7. The second bearing element 25 is arranged between the second flange 16 and the rotor 7. The bearing elements 24, 25 can be designed as ball bearings in particular.

Figure 5:
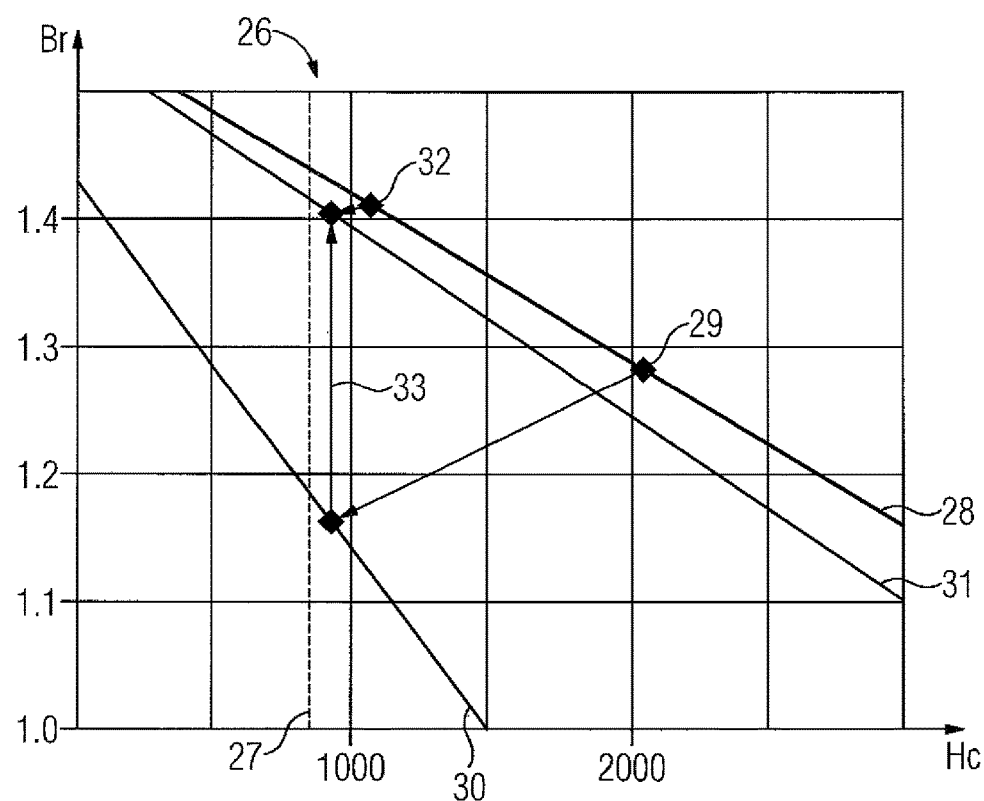
FIG. 5 is a diagram illustrating a change in magnetic quality of the permanent magnets of an inner stator of the electric machine as a function of the temperature.

FIG. 5 shows a graph 26 which represents the coercive field strength Hc on the x-axis and the remanence Br on the y-axis. Exemplary values for the coercive field strength Hc are represented in kA/m on the x-axis here. Furthermore, exemplary values for the remanence Br are represented on the y-axis. Furthermore, the broken line 27 indicates the minimum value for the coercive field strength Hc. The graph 26 is intended to show the connection between remanence Br, coercive field strength Hc and temperature. The straight line 28 here shows the connection between coercive field strength Hc and remanence Br for a permanent magnet 12 which is made from iron-neodymium-boron.

Such magnetic qualities with high remanence have a higher proportion of heavy rare earths. In this case, the point 29 represents a first material with high coercive field strength Hc and low remanence Br. When the temperature within the electric machine 1 is increased to a value of 130° C., for example, the coercive field strength Hc and the remanence Br of the first material change as a function of the temperature coefficients of the first material. With regard to the connection between coercive field strength Hc and remanence Br, the connection described by the straight line 30 applies.

If the permanent magnets 12 are now cooled by means of the first cooling device 20 using a cooling liquid, in particular water, and consequently heated up to a maximal temperature of only 40° C., materials having a lower coercive field strength Hc can be used. This is illustrated here by the straight line 31. If a second material as indicated here by the point 32 is used in this case, having a high remanence Br and a low coercive field strength Hc, this has the advantage firstly that the remanence Br is clearly increased, e.g. by a value of 20%. This is illustrated here by the arrow 33. A further advantage is derived in that fewer expensive rare earths need to be used for the permanent magnets 12. The selection of the first and the second material is based on the requirement that the minimum value for the coercive field strength Hc, as indicated by the line 27, must be satisfied, because demagnetization would otherwise occur during operation of the electric machine 1.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An electric machine, comprising:
   an outer stator having a plurality of windings;
   an inner stator having a plurality of permanent magnets and arranged within the outer stator in concentric relationship to the outer stator;
   a rotor arranged between the outer stator and the inner stator in concentric relationship to the outer and inner stators and movable relative to the outer and inner stators, said rotor comprising a mounting element made from a non-magnetic material and having a plurality of recesses, with a magnetically soft segment being arranged in each of the recesses;
   a first cooling device configured to cool the permanent magnets of the inner stator; and
   a second cooling device configured to cool the outer stator,
   wherein the first and the second cooling devices have a plurality of cooling tubes for passage of a cooling liquid, and
   wherein the cooling tubes are arranged in an iron core assembly of the inner stator and the outer stator.

2. The electric machine of claim 1, wherein the cooling tubes are uniformly distributed in a circumferential direction along an axial direction of the electric machine.

3. The electric machine of claim 1, wherein the permanent magnets of the inner stator are made from a ferrite.

4. The electric machine of claim 1, wherein the permanent magnets of the inner stator contain iron-neodymium-boron.

5. The electric machine of claim 1, wherein the rotor has a pot-shaped configuration.

6. The electric machine of claim 1, further comprising a hollow shaft, said rotor being connected to the hollow shaft.

* * * * *